(12) United States Patent
Yuan (10) Patent No.: US 10,289,162 B2
(45) Date of Patent: May 14, 2019

(54) DISPLAY DEVICE

(71) Applicant: AU OPTRONICS CORPORATION, Hsin-Chu (TW)

(72) Inventor: Shih-Wu Yuan, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 139 days.

(21) Appl. No.: 14/982,008

(22) Filed: Dec. 29, 2015

(65) Prior Publication Data

US 2016/0239049 A1 Aug. 18, 2016

(30) Foreign Application Priority Data

Feb. 13, 2015 (TW) .............................. 104202525 U (51) Int. Cl.
*G06F 1/16* (2006.01)
(52) U.S. Cl.
CPC .......... *G06F 1/1643* (2013.01); *G06F 1/1601* (2013.01); *G06F 1/1656* (2013.01)
(58) Field of Classification Search
CPC .............................. G06F 1/1601; G06F 3/0412
See application file for complete search history.

(56) References Cited

U.S. PATENT DOCUMENTS

| | | | | |
|---|---|---|---|---|
| 2004/0084595 A1* | 5/2004 | Tusavitz | .................... | A47F 5/10 248/346.07 |
| 2004/0235367 A1* | 11/2004 | Da Dalt | ................. | H02B 1/306 439/894 |
| 2007/0028710 A1* | 2/2007 | Kraus | .................... | A61F 2/4611 74/400 |
| 2007/0046644 A1* | 3/2007 | Lin | .......................... | G06F 1/169 345/173 |
| 2008/0018159 A1* | 1/2008 | Grunow | .................... | A47C 7/38 297/402 |
| 2011/0277396 A1* | 11/2011 | Schneider | ............. | F16B 5/0283 52/126.7 |
| 2013/0026785 A1* | 1/2013 | Davis | ...................... | B60R 21/34 296/187.04 |
| 2014/0084760 A1* | 3/2014 | Yu | ........................ | H05K 5/0217 312/7.2 |
| 2014/0153177 A1* | 6/2014 | Lin | ........................ | G06F 1/1643 361/679.21 |

FOREIGN PATENT DOCUMENTS

| | | |
|---|---|---|
| TW | 484639 | 4/2002 |
| TW | I275025 | 3/2007 |

* cited by examiner

*Primary Examiner* — William Lu
(74) *Attorney, Agent, or Firm* — McClure, Qualey & Rodack, LLP (57) ABSTRACT

A display device includes a frame and a display module. The frame includes a board and a protruding pillar, wherein the board has an outer surface and an inner surface, and the protruding pillar is disposed on the inner surface. The display module has a display surface surrounded by the board and a supporting case. The supporting case has a flange facing the inner surface of the board, wherein the flange has a through hole, and the protruding pillar passes through the through hole and is directly or indirectly connected to the flange. A gap between the flange and the inner surface is adjustable to make the display surface and the outer surface of the board be coplanar.

18 Claims, 10 Drawing Sheets

DISPLAY DEVICE

BACKGROUND OF THE INVENTION

1. Field of the Invention

The invention is related to a display device, especially a display device having a frame.

2. Description of the Prior Art

The technology of display device continuously evolves over time. At the same time, the demand on assembly accuracy for display device also raises gradually in the market. Nowadays most display devices are constructed by connecting the display panel and the system front cover, or by connecting the display panel, the touch panel, and the system front cover to become the touch display device. Regardless of the touch function, the surface of the display panel or the surface of the touch panel usually need to be co-planar with the system front cover because of the assembly design or other electric requirements.

Taking the touch display device for example, the conventional touch display device can be classified into two types: external type touch panel and embedded touch panel (ETP), wherein the external type touch panel is to attach the touch glass panel on the system front cover of the flat panel display device; the embedded touch panel is to have the touch panel directly embedded in the system front cover. Accordingly, compared to the external type touch panel, the embedded touch panel is much thinner and low cost due to the embedded feature, and gradually becomes more competitive in the market.

Figure 1:
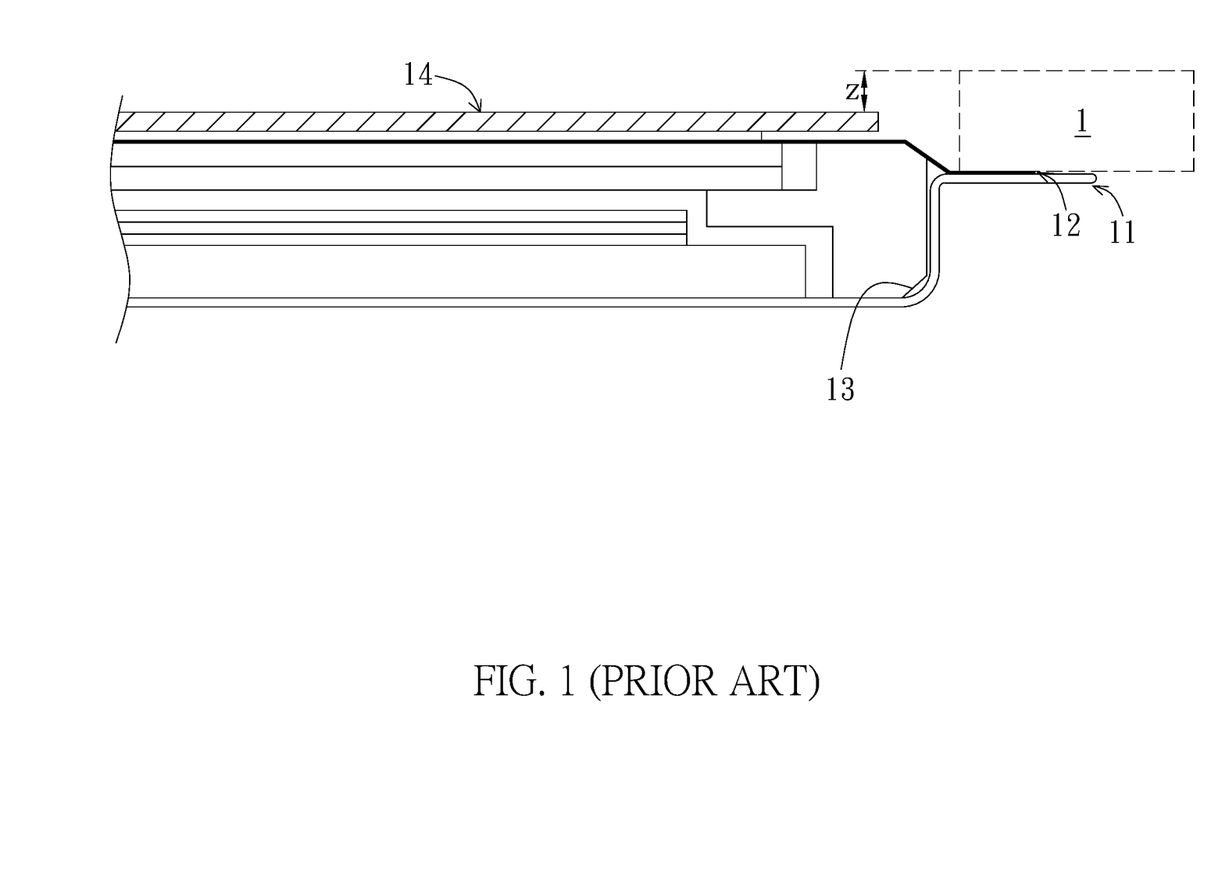
FIG. 1 is a schematic diagram of a conventional embedded touch panel (ETP).

In the design of the embedded touch panel, the system front cover and the touch panel need to be on the same plane to pass the electrical property test and achieve the smooth touch feeling. However, during the process of embedding the touch panel in the system front cover, the boundaries where the touch panel and the system front cover meet are difficult to be formed co-planar. That is, there is a difference in height between the outer surface of the touch panel and the outer surface of the system front cover. As shown in FIG. 1, FIG. 1 is a schematic diagram of a conventional embedded touch panel (ETP), which includes system front cover 1, bezel 11, tape 12, supporting frame 13, and touch panel 14. Since the system front cover 1 is supported by the bezel 11, assembly variances will occur due to the stack tolerances of the bezel 11, the tape 12, the supporting frame 13, and the touch panel 14. When all of the tolerances is accumulated, the difference in height "Z" will become very difficult to control and the production yield rate is not satisfied.

SUMMARY OF THE INVENTION

In view of the above problems, in one aspect, the present invention provides a display device including: a frame having a board and a protruding pillar, wherein the board has an outer surface and an inner surface, the protruding pillar is disposed on the inner surface; and a display module having a display surface surrounded by the board, wherein the display module includes a supporting case having a flange facing the inner surface of the board, wherein the flange has a through hole; the protruding pillar passes through the through hole and is directly or indirectly connected to the flange; a gap disposed between the flange and the inner surface is adjustable to make the display surface and the outer surface of the board be coplanar.

In another aspect, the present invention provides a display device which is assembled on a plane. The display device includes: a frame including a board and a protruding pillar, wherein the board has an outer surface and an inner surface; the protruding pillar is disposed on the inner surface, wherein the frame is to be assembled in a manner that the frame is disposed on the plane with the outer surface facing the plane; and a display module having a display surface surrounded by the board, wherein the display surface is to be assembled in a manner that the display module is disposed on the plane with the display surface facing the plane; the display module includes a supporting case; the supporting case has a flange facing the inner surface of the board, wherein the flange a through hole; the protruding pillar passes through the through hole and is directly or indirectly connected to the flange; a gap between the flange and the inner surface is adjustable to make the display surface and the outer surface of the board lie on the plane.

Compared to the conventional technology, the display device of this invention adopts the concept of co-planar in assembly and uses the protruding pillar of the frame, the through hole on the supporting case of the display module, and the gap between the frame and the flange of the display module to fine-tune and fix to reduce the assembly variation caused by the accumulated tolerance, so that it can pass the electrical property test and achieve the smooth touch feeling. Accordingly, the display device of this invention can increase the assembly accuracy and the production yield rate, and indirectly reduce the cost and increase the profits.

DETAILED DESCRIPTION OF THE PREFERRED EMBODIMENT

Figure 2A:
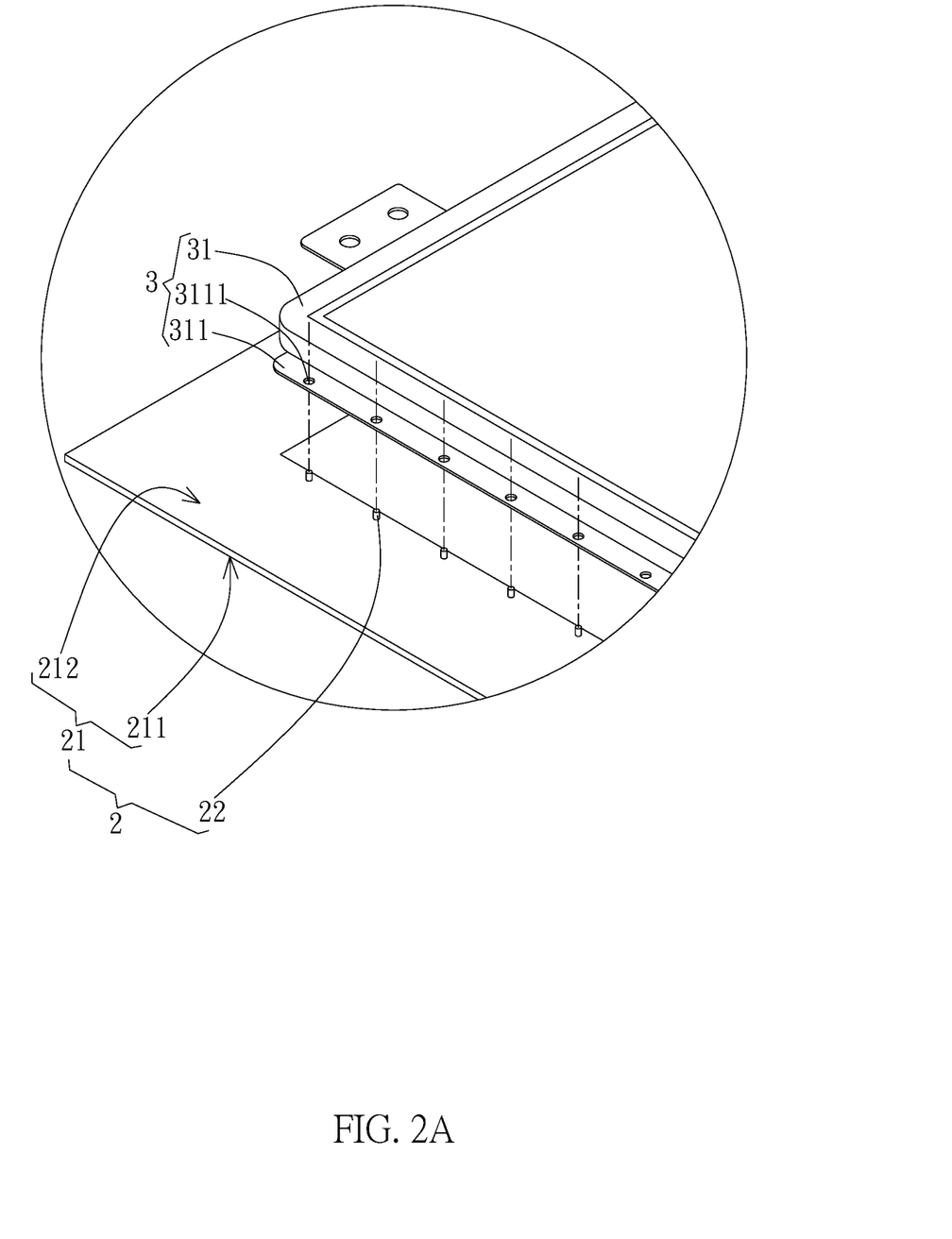
FIG. 2A-FIG. 2C are schematic diagrams of the display device in one embodiment.
Figure 2B:
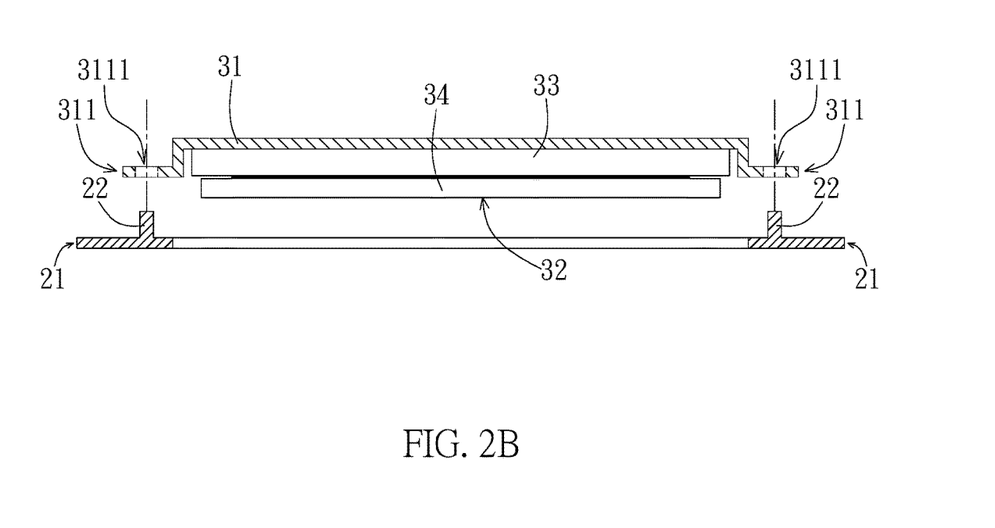

Please refer to FIG. 2A and FIG. 2B, the display device of this invention includes a frame 2 and a display module 3. The frame 2 has a board 21 and a protruding pillar 22, wherein the board 21 has an outer surface 211 and an inner surface 212, both preferably facing toward opposite sides. The protruding pillar 22 is disposed on the inner surface 212, wherein the protruding pillar 22 is preferably in the shape of a cylinder. The display module 3 includes a supporting case 31, a display unit 33, and a touch unit 34. The display unit 33 is preferably a liquid crystal display panel or other different types of flat display panels. The touch unit 34 is preferably a one-glass-solution (OGS) touch panel and is disposed on the display unit 33, but not limited thereto. In different embodiments, the disposition of the touch unit 34 is optional; alternatively, the touch function can be embedded in the display unit 33. In this embodiment, the touch unit 34 and the display unit 33 can fix to each other by curing glue or double-sided tape, but not limited thereto.

Figure 2C:
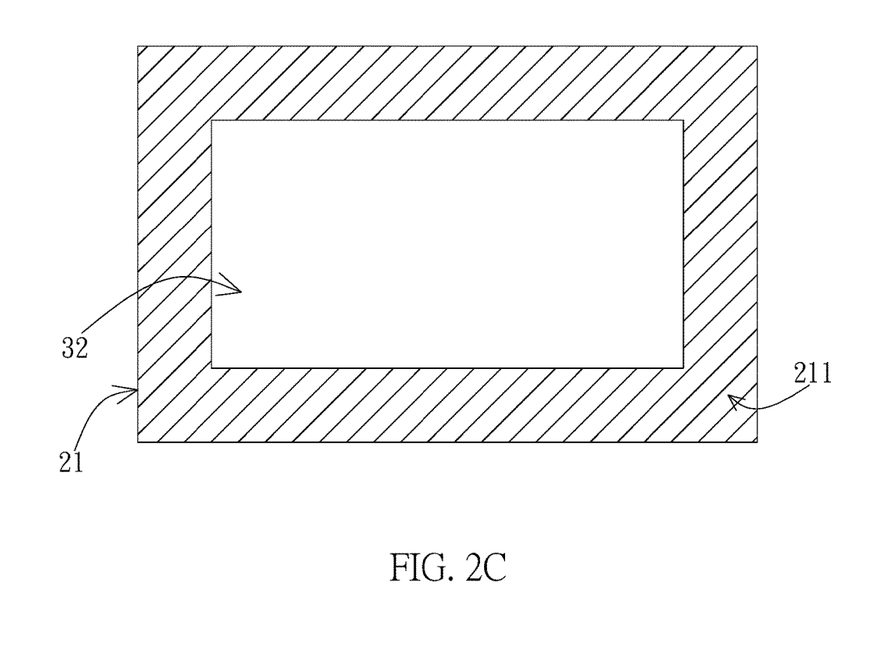

The surface of the touch unit 34 that faces away from the display unit 33 and is provided for touch operation is a display surface 32. As shown in FIG. 2C, looking toward the display surface 32, the display surface 32 is surrounded by the board 21 and provided for users' touch operation. In an embodiment without the touch unit 34, the display surface is the surface of the display unit 33 that displays image outwardly.

The supporting case 31 can be formed by metal or plastic and is configured to accommodate the display unit 33 and the touch unit 34. The supporting case 31 can be formed to have the shape of a tray or a frame with hollow center. The side of the supporting case 31 has a flange 311 facing the inner surface 212 of the board 21. The flange 311 has a through hole 3111, wherein the quantity, shape and position of the through hole 3111 are preferably designed corresponding to the protruding pillar 22. In this embodiment, the through hole 3111 is preferably in the shape of a circle, and its diameter is slightly larger than the diameter of the protruding pillar 22. The through hole 3111 is configured to allow the protruding pillar 22 to pass through and connect to the flange 311.

Figure 3A:
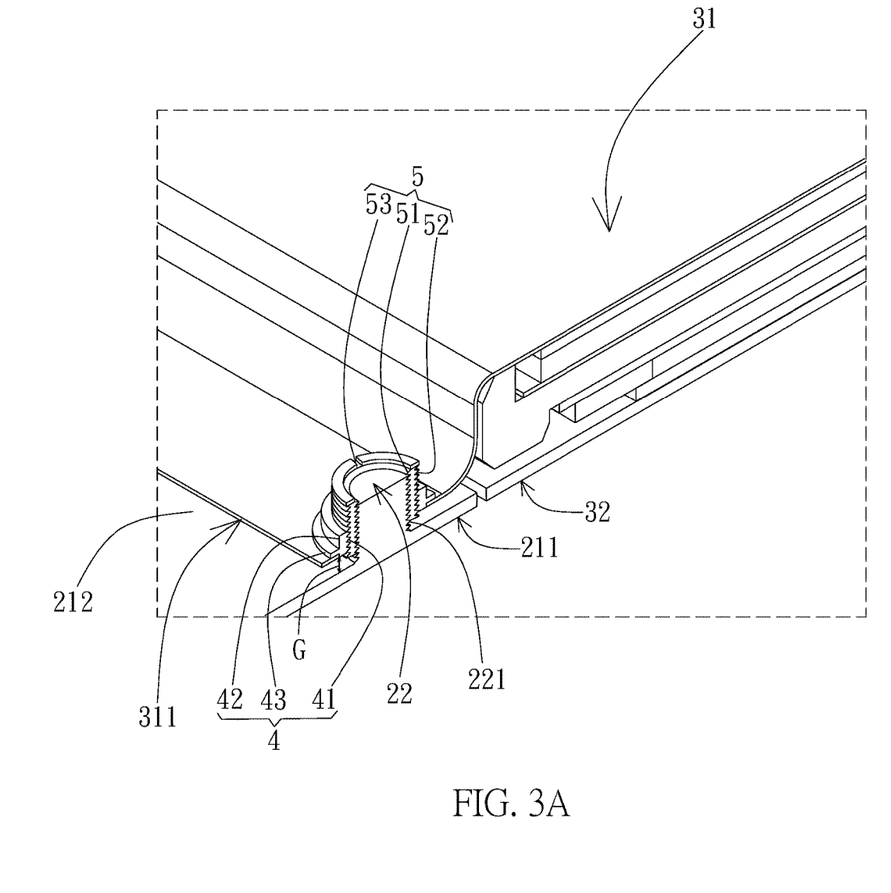
FIG. 3A-FIG. 3E are schematic diagrams of the protruding pillar and the flange in one embodiment.
Figure 3B:
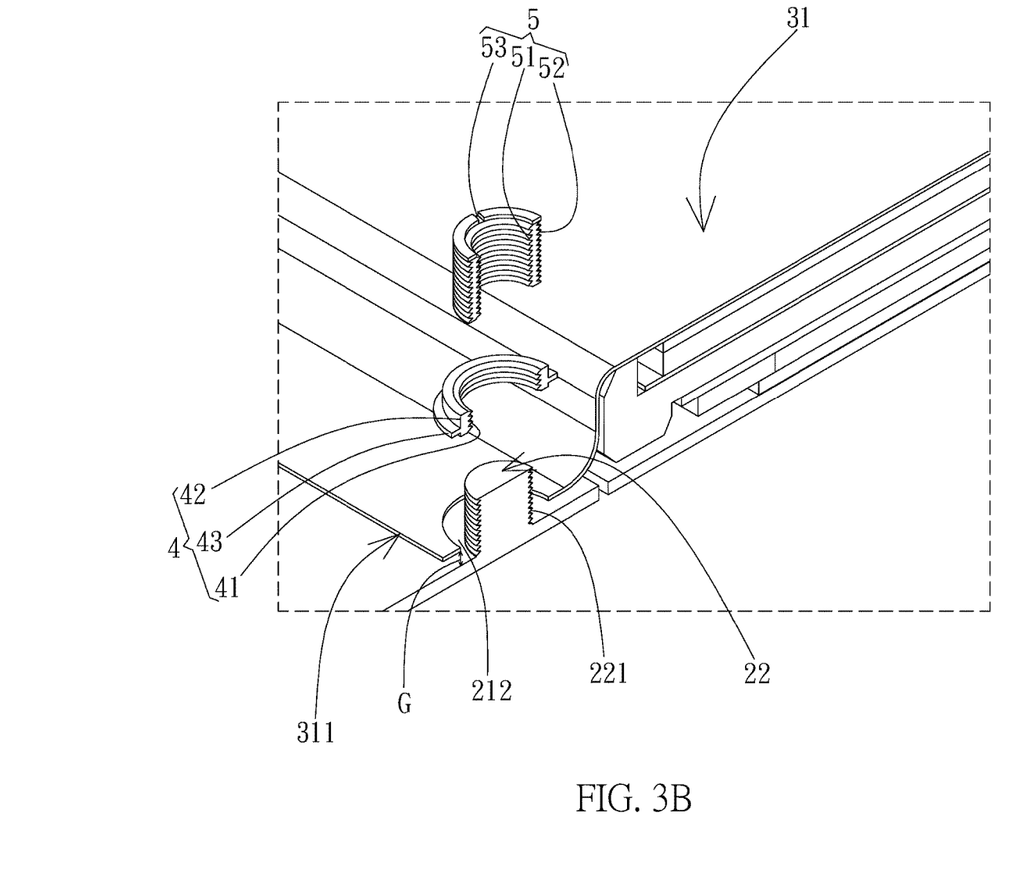

It is noted that the connecting way of the protruding pillar 22 and the flange 311 includes direct connection and indirect connection. For example, as shown in FIG. 3A and FIG. 3B, in the indirect connection, the pillar 22 and the flange 311 are connected via connection means, such as connecting ring 4 and connecting sleeve 5. Particularly, the connecting ring 4 and the connecting sleeve 5 are disposed in the space between the protruding pillar 22 and the through hole, wherein the connecting ring 4 connects the edge of the through hole 3111, and an inner side of the connecting ring 4 has a first screw thread 41. The connecting ring 4 can have a wall portion 42 and a flange portion 43. The flange portion 43 extends outward from the outer side of the wall portion 42. The first screw thread 41 is formed on an inner surface of the wall portion 42. The protruding pillar 22 has a second screw thread 221. The connecting sleeve 5 has an internal screw thread 51 and an external screw thread 52.

Figure 3C:
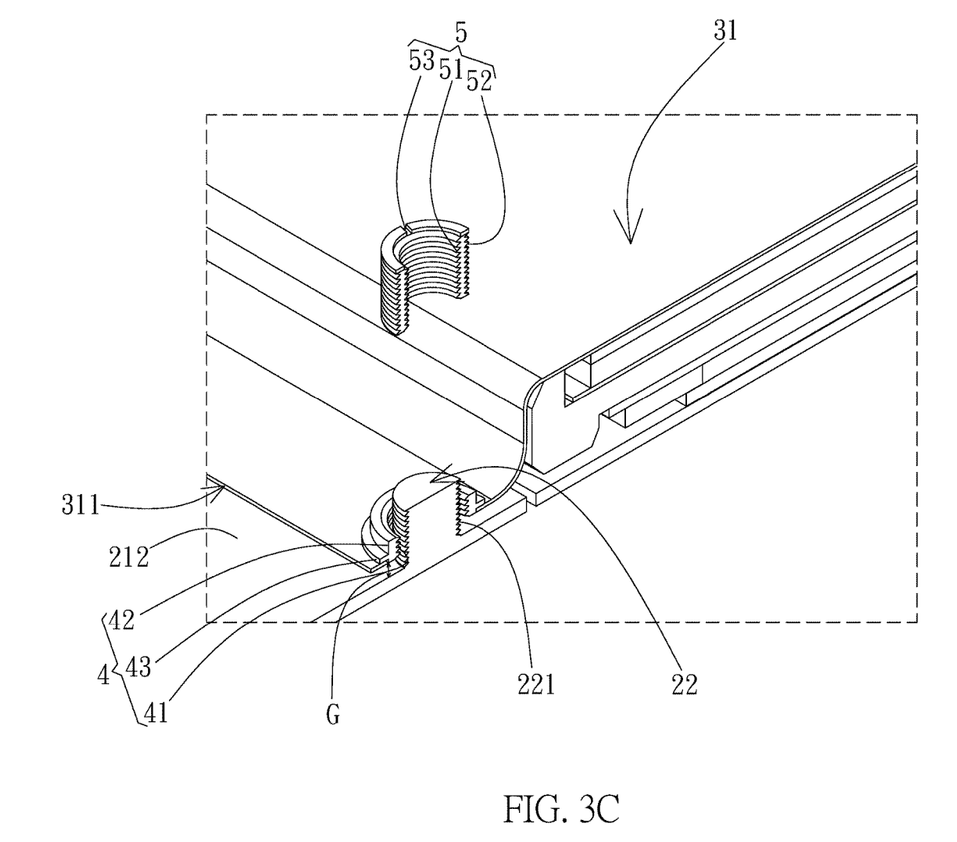

Further, the detail of the connecting way is shown in FIG. 3C. Firstly, the display module is assembled from a direction toward the inner surface 212 of the board 21. In this embodiment, the display module is assembled in a reverse direction. However, in other embodiments, the display be assembled in other ways. Next, the connecting ring 4 is disposed in the through hole 3111 to surround the protruding pillar 22, wherein the flange portion 43 stacks on the edge of the through hole 3111. And between the flange portion 43 and the edge of the through hole 3111 of the supporting case 31, the glue or the tape can be disposed to enhance the connection, but not limited thereto. Then, the connecting sleeve 5 is turned and interposed into the space between the connecting ring 4 and the protruding pillar 22.

The external screw thread 52 of the connecting sleeve 5 mates to the first screw thread 41 of the connecting ring 4, and the internal screw thread 51 mates to the second screw thread 221 of the protruding pillar 22. The internal screw thread 51 and the external screw thread 52 preferably have a same advancing direction when rotating toward the same direction. In this embodiment, the first screw thread 41 of the connecting ring 4, the internal screw thread 51 and the external screw thread 52 of the connecting sleeve 5, and the second screw thread 221 of the protruding pillar 22 can be designed with the right-handed screw thread. That is, the connecting sleeve 5 turns clockwise to advance forward. A rotation adjustment structure 53, e.g. notch, for receiving force to drive the connecting sleeve 5 to rotate can be provided on the top surface of the connecting sleeve 5. As such, the user can exerts force on the rotation adjustment structure 53 to turn the connecting sleeve 5 by such as a screwdriver, but not limited thereto. The assembled structure after connection is shown in FIG. 3A.

However, it is noted that after the display module 3 and the board 21 are assembled, there is a gap G between the flange 311 and the inner surface 212 of the board 21, wherein the gap G is adjustable to make the display surface 32 and the outer surface 211 of the board 21 be co-planar during assembly. After adjusting the gap G, the display module 3 and the board 21 are fixed together by the connecting sleeve 5 and the connecting ring 4, and glue, such as silicon glue or other similar material, can be disposed between the connecting sleeve 5 and the connecting ring 4 and between the connecting sleeve 5 and the protruding pillar 22, but not limited thereto. Accordingly, besides the enhancement of structure stability, the impact force also can be absorbed by the glue. If re-assembly is required, the connecting sleeve 5 can be turned counterclockwise and disassembled from the protruding pillar 22 and the connecting ring 4 by tools, such as screwdriver, and the glue will peel off naturally due to the rotation force. Consequently, the re-assembly can be performed without difficulty.

Figure 3D:
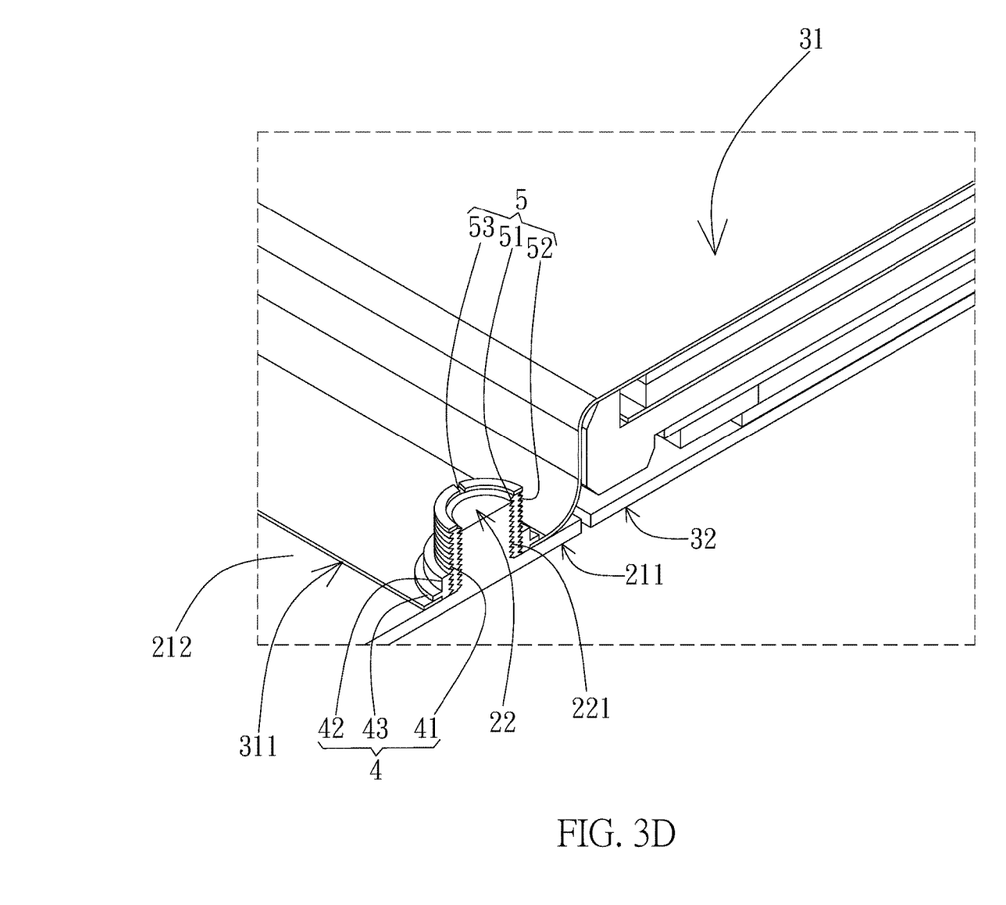

In this embodiment, the connecting sleeve 5 can be adapted to different gap G which is generated due to non-uniform tolerance. That is, even if the gap G of each product is different, it still can be connected by the connecting sleeve 5. Specifically, the gap G between the flange 311 of the display device and the inner surface 212 of the board 21 provides enough allowance to avoid the assembly variation caused by the accumulated tolerance during assembly. As shown in FIG. 3D, when the flange 311 abuts against the inner surface 212 of the board 21, i.e. no gap G, it must confirm precisely the stack tolerance and the size tolerance of every element which affects the smooth level of the surface, making the co-planar arrangement become difficult.

Moreover, when the height of the connecting sleeve 5 is higher than the height of the protruding pillar 22 or the connecting ring 4, the connecting relationship still can be maintained in a bigger gap G situation. The corresponding height between the protruding pillar 22 and the connecting ring 4 is not limited. Preferably, the height of the protruding pillar 22 is higher than the height of the connecting ring 4 to facilitate the assembly process and achieve a stable structure.

Figure 3E:
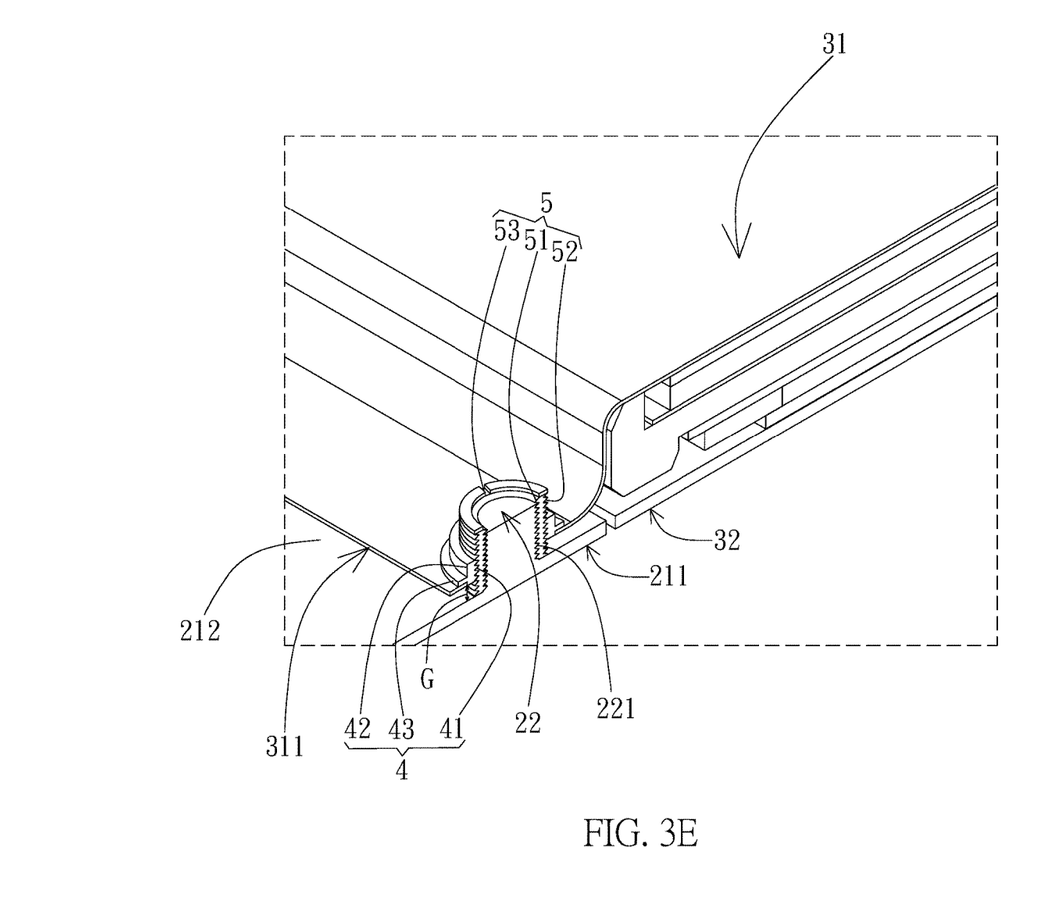

In addition, to ensure that the complete structure is much more stable, the connecting sleeve 5 can be selectively tuned and advances to the bottom, as shown in FIG. 3E; that is, the connecting sleeve 5 is turned until the bottom surface of the connecting sleeve 5 contacting the inner surface 212 of the board 21.

As set forth above, when the gap G needs to be re-adjusted, it can be performed by simply withdrawing the connecting sleeve 5. When the gap G is properly adjusted, the connecting sleeve 5 is turned and interposed to position the flange 311 and the protruding pillar 22 relatively. That is, the gap G is still adjustable after the protruding pillar 22 connects the flange 311.

Figure 4:
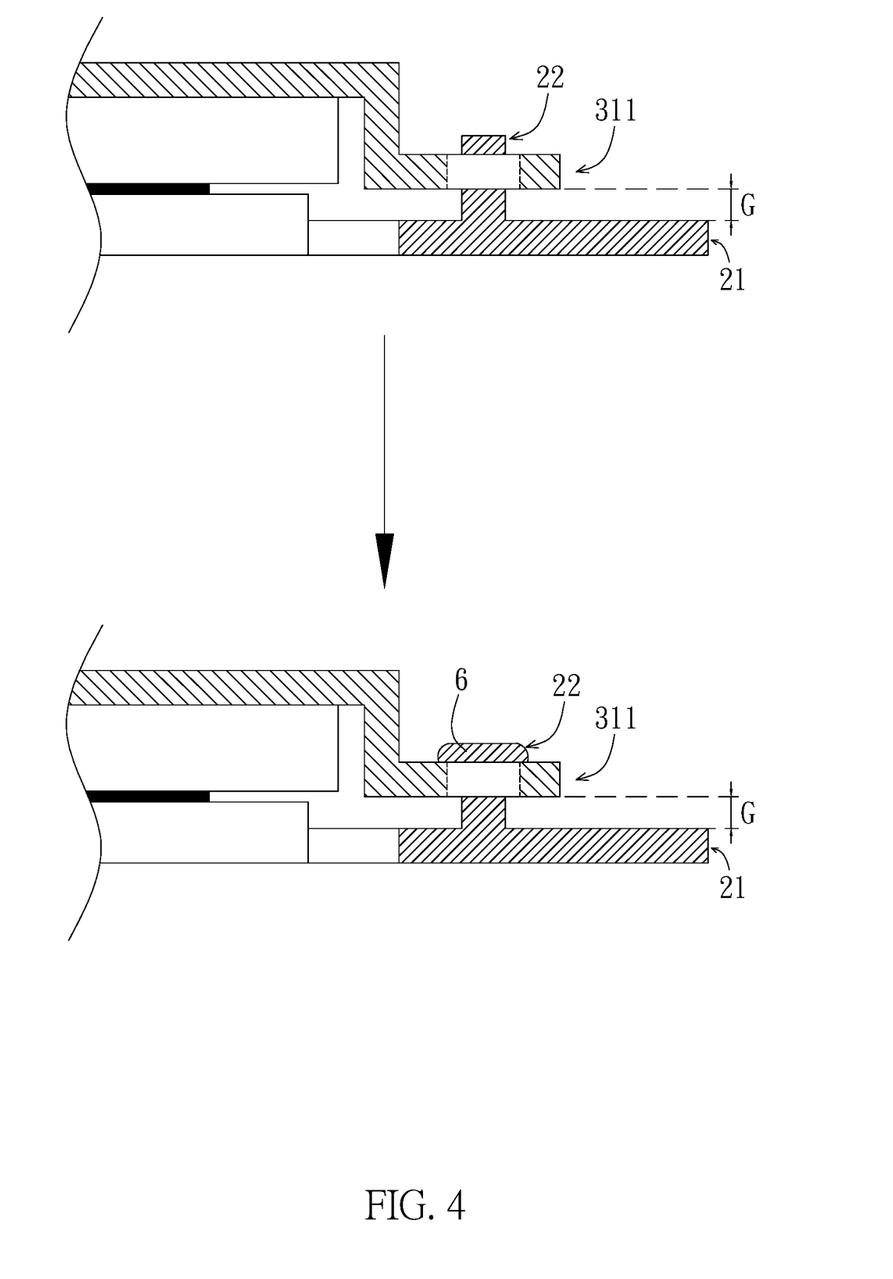
FIG. 4 is a schematic diagram of the protruding pillar and the flange in another embodiment.

In another embodiment of the present invention, the protruding pillar and the flange can be connected directly. As shown in FIG. 4, when the gap G is properly adjusted to make the display surface and the outer surface of the board 21 be co-planar, a portion of the protruding pillar 22 that passes through the flange 311 is hot-melted to form a hot-melted portion 6 on the top of the protruding pillar 22; the hot-melted portion 6 connects the surface of the flange 311 that is opposite to the board 21 or permeates into the through hole 3111 to form connection, but not limited thereto. In other embodiments, the rest structure of the display module and the board is the same as the above embodiment, and the details thereof will not be given hereinafter.

Figure 5A:
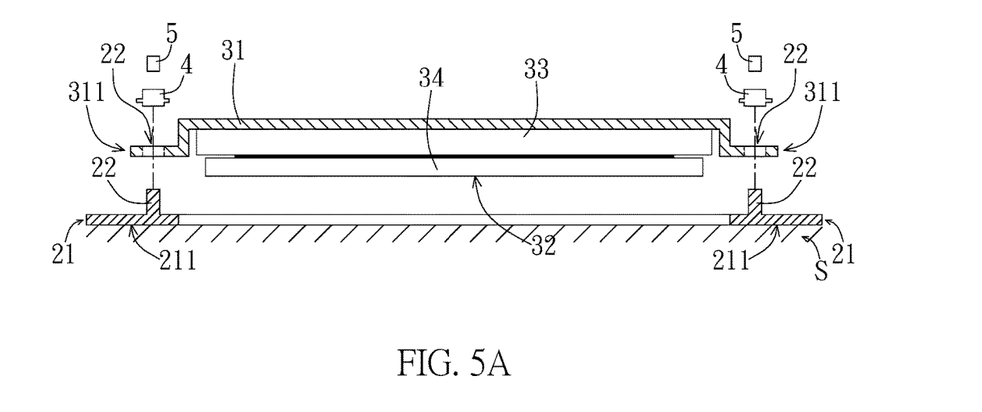
FIG. 5A-FIG. 5C are schematic diagrams of the display device in another embodiment.
Figure 5B:
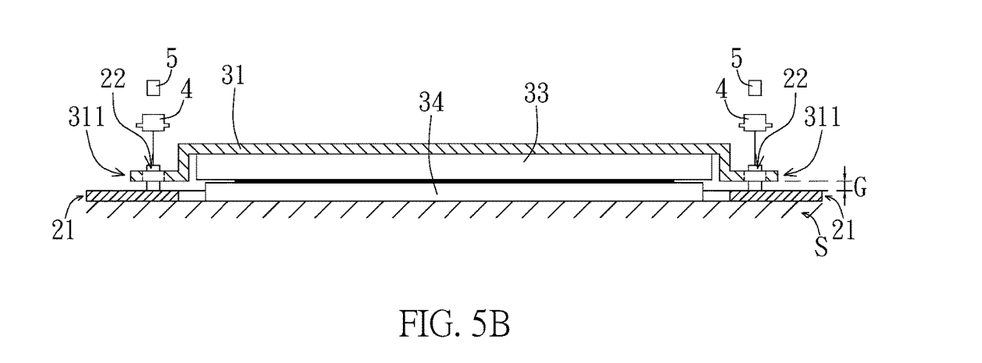
Figure 5C:
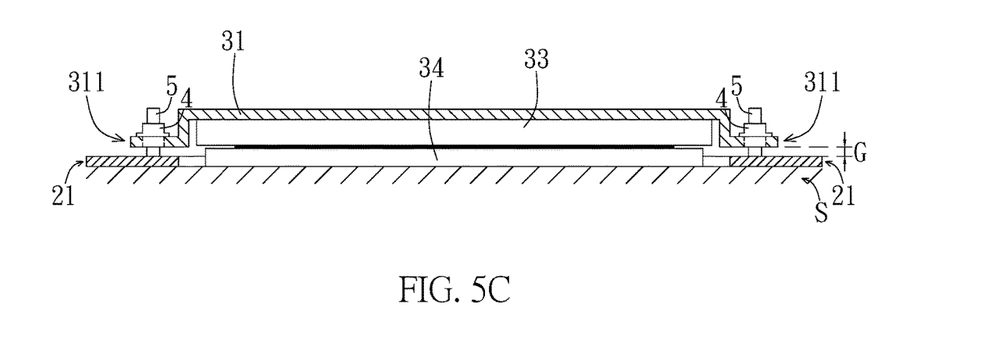

In another embodiment of the present invention, it illustrates the display device is assembled on a plane. Please refer to FIG. 5A-FIG. 5C. As shown in FIG. 5A, firstly, the frame is disposed on the plane S with the outer surface 211 of the board 21 of the frame facing the plane S. Next, as shown in FIG. 5B, the display module is disposed on the plane S with the display surface 32 facing the plane S. As such, the display surface 32 and the outer surface 211 of the board 21 can be on the same plane S. During the assembly process, by adjusting the gap G between the flange 311 and the inner surface 212 of the board 21, the display surface 32 and the outer surface of the board 21 both lie on the plane S. Finally, as shown in FIG. 5C, the connecting ring 4 is disposed on the edge of the through hole 3111, then the connecting sleeve 5 is turned and advances into the space between the protruding pillar 22 and the connecting ring 4 for fixation. Certainly, in this embodiment, it is possible to directly connect the protruding pillar 22 to the flange 311 by hot melting.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A display device, comprising:
   a frame having a board and a protruding pillar, the board having an outer surface and an inner surface, the protruding pillar extending from the inner surface; and
   a display module having a display surface surrounded by the board, the display module further having:
   a supporting case having a flange facing the inner surface of the board, the flange having a through hole;
   a connecting ring disposed in the through hole, wherein the connecting ring surrounds the protruding pillar and is connected to an edge of the through hole; a first screw thread is on an inner side of the connecting ring; and
   a connecting sleeve disposed between the connecting ring and the protruding pillar, wherein the connecting sleeve has an internal screw thread and an external screw thread; the external screw thread mates to the first screw thread, and the internal screw thread mates to a second screw thread of the protruding pillar;
   wherein the protruding pillar passes into the through hole; wherein the flange and the inner surface are movable relative to each other, based on movement of the protruding pillar in the through hole, to adjust a gap between the flange and the inner surface such that the display surface and the outer surface of the board are coplanar.

2. The display device as claimed in claim 1, wherein the gap is still adjustable after the protruding pillar is connected to the flange.

3. The display device as claimed in claim 1, wherein a height of the connecting sleeve is higher than a height of the protruding pillar.

4. The display device as claimed in claim 1, wherein a height of the connecting sleeve is higher than a height of the connecting ring.

5. The display device as claimed in claim 1, wherein a top surface of the connecting sleeve has a rotation adjustment structure for receiving force to drive the connecting sleeve to rotate.

6. The display device as claimed in claim 1, wherein the internal screw thread and the external screw thread have a same advancing direction when rotating toward a same direction.

7. The display device as claimed in claim 1, wherein the connecting ring has a wall portion and a flange portion, the flange portion extends outward from an outer side of the wall portion, the first screw thread formed on an inner surface of the wall portion, and the flange portion stacks on the edge of the through hole.

8. The display device as claimed in claim 1, wherein a bottom surface of the connecting sleeve selectively contacts the inner surface of the board.

9. The display device as claimed in claim 1, wherein the display module comprises:
   a display unit; and
   a touch unit disposed on the display unit, wherein the display surface is a surface of the touch unit that is opposite to the display unit and is provided for touch operation.

10. A display device assembled on a plane, the display device comprising:
    a frame having a board and a protruding pillar, the board having an outer surface and an inner surface, the protruding pillar extending from the inner surface, wherein the frame is to be assembled in a manner that the frame is disposed on the plane with the outer surface facing the plane; and
    a display module having a display surface surrounded by the board, wherein the display module is to be assembled in a manner that the display module is disposed on the plane with the display surface facing the plane; the display module further having:
    a supporting case having a flange facing the inner surface of the board, the flange having a through hole;
    a connecting ring disposed in the through hole, wherein the connecting ring surrounds the protruding pillar and is connected to an edge of the through hole; a first screw thread is on an inner side of the connecting ring; and
    a connecting sleeve disposed between the connecting ring and the protruding pillar, wherein the connecting sleeve has an internal screw thread and an external screw thread; the external screw thread mates to the first screw thread, and the internal screw thread mates to a second screw thread of the protruding pillar;
    wherein the protruding pillar passes into the through hole; wherein the flange and the inner surface are movable relative to each other, based on movement of the protruding pillar in the through hole, to adjust a gap between the flange and the inner surface such that the display surface and the outer surface of the board lie on the plane.

11. The display device as claimed in claim 10, wherein the gap is still adjustable after the protruding pillar is connected to the flange.

12. The display device as claimed in claim 10, wherein a height of the connecting sleeve is higher than a height of the protruding pillar.

13. The display device as claimed in claim 10, wherein a height of the connecting sleeve is higher than a height of the connecting ring.

14. The display device as claimed in claim 10, wherein a top surface of the connecting sleeve has a rotation adjustment structure for receiving force to drive the connecting sleeve to rotate.

15. The display device as claimed in claim 10, wherein the internal screw thread and the external screw thread have a same advancing direction when rotating toward a same direction.

16. The display device as claimed in claim 10 wherein the connecting ring has a wall portion and a flange portion, the flange portion extends outward from an outer side of the wall portion, the first screw thread formed on an inner surface of the wall portion, and the flange stacks on the edge of the through hole.

17. The display device as claimed in claim 10, wherein a bottom surface of the connecting sleeve selectively contacts the inner surface of the board.

18. The display device as claimed in claim 10, wherein the display module comprises:
   a display unit; and
   a touch unit disposed on the display unit; wherein the display surface is a surface of the touch unit that is opposite to the display unit and provided for touch operation.

* * * * *